C. A. BAECHLER.
SOLUBLE CASEIN.
APPLICATION FILED SEPT. 7, 1909.

999,084.

Patented July 25, 1911.

WITNESSES
Jesse B. Heller
Walter Tamariss

INVENTOR
C. A. Baechler,
by Bakewell, Byrnes & Parmelee,
his Attys.

UNITED STATES PATENT OFFICE.

CARL ALBRECHT BAECHLER, OF ZURICH, SWITZERLAND.

SOLUBLE CASEIN.

999,084.     Specification of Letters Patent.     Patented July 25, 1911.

Original application filed November 10, 1908, Serial No. 461,925. Divided and this application filed September 7, 1909. Serial No. 516,330.

*To all whom it may concern:*

Be it known that I, CARL ALBRECHT BAECHLER, a citizen of Switzerland, residing at 5 Köllikerstrasse, Zurich, Switzerland, dairy-engineer, have invented certain new and useful Improvements in Soluble Casein, of which the following is a specification.

Hitherto finely subdivided casein, has only been obtainable from a casein made either by grinding the curd separated directly from the milk, or by re-dissolving the curd and precipitating the subdivided casein from the solution or drying the solution.

This invention which was originally included in my application filed 10th November 1908 Serial No. 461,925, relates to the manufacture of alkaline casein from a casein obtained directly from milk in a finely subdivided or more or less pulverulent condition, so that it does not have to be ground.

The accompanying drawing will make clear the distinction between the product of this invention and the forms of finely divided casein hitherto known.

Each figure is a copy of a microphotograph, the magnification being 200 diameters.

Figure 1:
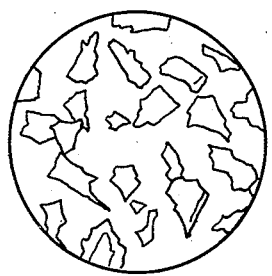
Figure 2:
Figure 3:
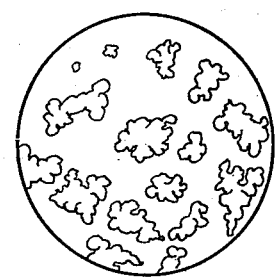

Figure 1 represents ordinary ground casein, Fig. 2 casein which has been redissolved and precipitated or obtained by drying the solution, and Fig. 3 the product made according to the present invention, having grains finely subdivided by agitation when the coagulum is formed and which have rounded and not angular profiles.

In the application above referred to, a process for making dry finely subdivided casein of a neutral nature is described, and the following example is given by way of illustration:—To the skim milk, warmed to 30°–32° C., calcium chlorid dissolved in a little water is added to the extent of 0.5 part of the salt per 1000 parts of the skim milk. A solution of rennet ferment is then added in such proportion that coagulation begins within 5 minutes. At the moment when the first indication of coagulation is perceived, rapid stirring by means of a stirring device is started and when the casein has become finely subdivided, 1 part per 1000 of ammonia alum, dissolved in a little water, is added; the whole is now heated, while stirring, until during 5–10 minutes the temperature has risen gradually to 52° C., whereupon, while still stirring, the whole is cooled again in any known suitable manner, the temperature being brought to 15° C. The alum may be added before the rennet ferment or together therewith, instead of at the stage stated.

The casein is separated from the whey either by filtration or centrifugal action and washed; in the first case it is pressed and in either case the cake obtained is broken up and dried in a current of air, with aid of warming if necessary; the drying is complete in a few hours. The casein thus obtained is neutral. To render it alkaline, the casein which has been pressed or subjected to centrifugal action, is moistened before it has completely dried, with a solution containing a small percentage of an alkali, such as sodium bicarbonate and is then further treated as prescribed for the neutral casein. The proportion of alkali added depends on the purpose for which the casein is destined; for instance, some 3–5 per cent. of sodium bicarbonate, calculated in the dry casein may be added if it is merely required that the alkali casein shall be soluble in water.

Having thus described my invention and the best means I know of carrying the same into practical effect, I claim:—

1. A process for the manufacture of a finely subdivided alkaline casein, which process consists in first adding to the milk an agent to form a coagulum of casein and an agent to act upon and cause the casein to shrink, then, at the moment when the coagulation is first perceived, rapidly agitating the whole until the casein is in a finely subdivided condition, then, while continuing to agitate, successively heating the whole to a temperature not exceeding 100° C. and cooling it to a temperature not below 0° C., then separating the casein, then moistening the casein with a solution of an alkali, and finally drying the casein.

2. As a new article of manufacture, finely subdivided but unground alkaline casein soluble in water, and having the form of grains with rounded profiles, which grains do not agglomerate.

3. As a new article of manufacture, alkaline casein consisting of minute grains having rounded profiles, which do not agglomerate, and being soluble in water.

In testimony whereof I have signed my name to this specification in the presence of two subscribing witnesses.

CARL ALBRECHT BAECHLER.

Witnesses:
  A. BOLLER,
  A. STORRER.